United States Patent
Georgiou et al.

(10) Patent No.: US 10,459,065 B2
(45) Date of Patent: Oct. 29, 2019

(54) INDOOR LOCALIZATION USING RECEIVED SIGNAL QUALITY WEIGHTS

(71) Applicant: Kabushiki Kaisha Toshiba, Minato-ku (JP)

(72) Inventors: Orestis Georgiou, Bristol (GB); William Thompson, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 75 days.

(21) Appl. No.: 15/443,470

(22) Filed: Feb. 27, 2017

(65) Prior Publication Data
US 2017/0356979 A1   Dec. 14, 2017

(30) Foreign Application Priority Data

Jun. 13, 2016  (GB) .................................. 1610281.6

(51) Int. Cl.
| | |
|---|---|
| *H04W 4/02* | (2018.01) |
| *G01S 5/02* | (2010.01) |
| *G01S 5/14* | (2006.01) |

(52) U.S. Cl.
CPC .............. *G01S 5/0215* (2013.01); *G01S 5/14* (2013.01); *H04W 4/023* (2013.01)

(58) Field of Classification Search
None
See application file for complete search history.

(56) References Cited

U.S. PATENT DOCUMENTS

| | | | |
|---|---|---|---|
| 5,666,662 A | | 9/1997 | Shibuya |
| 6,700,875 B1 | * | 3/2004 | Schroeder ............. H04H 20/77 370/252 |

(Continued)

FOREIGN PATENT DOCUMENTS

| | | |
|---|---|---|
| CN | 101715232 A | 5/2010 |
| CN | 102395192 A | 3/2012 |

(Continued)

OTHER PUBLICATIONS

Great Britain Search Report dated Dec. 19, 2016 in GB1610281.6, filed on Jun. 13, 2016.

(Continued)

*Primary Examiner* — Lana N Le
(74) *Attorney, Agent, or Firm* — Oblon, McClelland, Maier & Neustadt, L.L.P.

(57) ABSTRACT

There is provided a system and method for determining the location of a target device relative to a set of anchor nodes having known locations in an environment wherein the line of sight between the target device and one or more of the anchor nodes is impeded. The system is configured to, for each anchor node: receive a signal transmitted between the anchor node and the target device; determine, based on the signal, an estimate of the distance between the target device and the anchor node or an estimate of the angle of arrival of the signal to the target device; determine a received signal quality indicator based on the signal; and, assign a weight for the signal based on the received signal quality indicator. The system is further configured to determine the position of the target device based on the estimated distances or angles of arrival, the corresponding weights and the locations of the anchor nodes.

12 Claims, 12 Drawing Sheets

(56) References Cited

U.S. PATENT DOCUMENTS

| | | | |
|---|---|---|---|
| 6,912,250 B1* | 6/2005 | Adireddy et al. | H04L 25/0357 |
| | | | 375/232 |
| 7,920,874 B2* | 4/2011 | Fukui | G01S 5/0215 |
| | | | 342/450 |
| 2002/0196187 A1 | 12/2002 | Holt | |
| 2003/0043894 A1* | 3/2003 | Sestok et al. | H04L 5/16 |
| | | | 375/219 |
| 2007/0060170 A1 | 3/2007 | Fukui | |
| 2008/0032710 A1 | 2/2008 | Guvenc et al. | |
| 2009/0191894 A1 | 7/2009 | Poegel et al. | |
| 2011/0045840 A1* | 2/2011 | Shabdiz | G01S 5/02 |
| | | | 455/456.1 |
| 2012/0309410 A1 | 12/2012 | Marti et al. | |
| 2014/0018111 A1* | 1/2014 | Farley | H04W 4/023 |
| | | | 455/456.6 |
| 2014/0141796 A1* | 5/2014 | Marti | G01S 5/0252 |
| | | | 455/456.1 |
| 2014/0226822 A1* | 8/2014 | Engdegard | G10L 25/69 |
| | | | 381/3 |
| 2016/0323091 A1* | 11/2016 | Inoue | H04L 27/38 |
| 2017/0108579 A1* | 4/2017 | Irvine | G01S 5/08 |
| 2017/0254878 A1* | 9/2017 | Castellanos | G01S 5/0252 |
| 2017/0265043 A1* | 9/2017 | Lee | H04W 64/00 |
| 2017/0347274 A1* | 11/2017 | Li | H04W 8/26 |
| 2018/0013577 A1* | 1/2018 | Kang | H04L 25/3267 |
| | | | 375/219 |
| 2018/0128623 A1* | 5/2018 | Surnilla | G01C 21/10 |

FOREIGN PATENT DOCUMENTS

| | | |
|---|---|---|
| EP | 2 469 298 A1 | 6/2012 |
| JP | 2005-252844 A | 9/2005 |
| JP | 2007-71816 A | 3/2007 |
| JP | 2010-43996 A | 2/2010 |
| JP | 2010-48783 A | 3/2010 |
| JP | 2011-99778 A | 5/2011 |
| JP | 2012-257245 A | 12/2012 |
| WO | WO 2008/001421 A1 | 1/2008 |

OTHER PUBLICATIONS

Andreas Savvides, "Dynamic Fine-Grained Localization in Ad-Hoc Networks of Sensors", Proceedings of the 7$^{th}$ annual international conference on Mobile computing and networking, ACM 2001, pp. 166-179.

Jahyoung Koo, "Localizing WiFi Access Points Using Signal Strength", Communications Letters, IEEE 15.2 (2001), 187-189.

Dr. James Little, "A Technical Review of Cisco's WiFi Based Location Analytics", White Paper, Jul. 2013, pp. 1-9.

\* cited by examiner

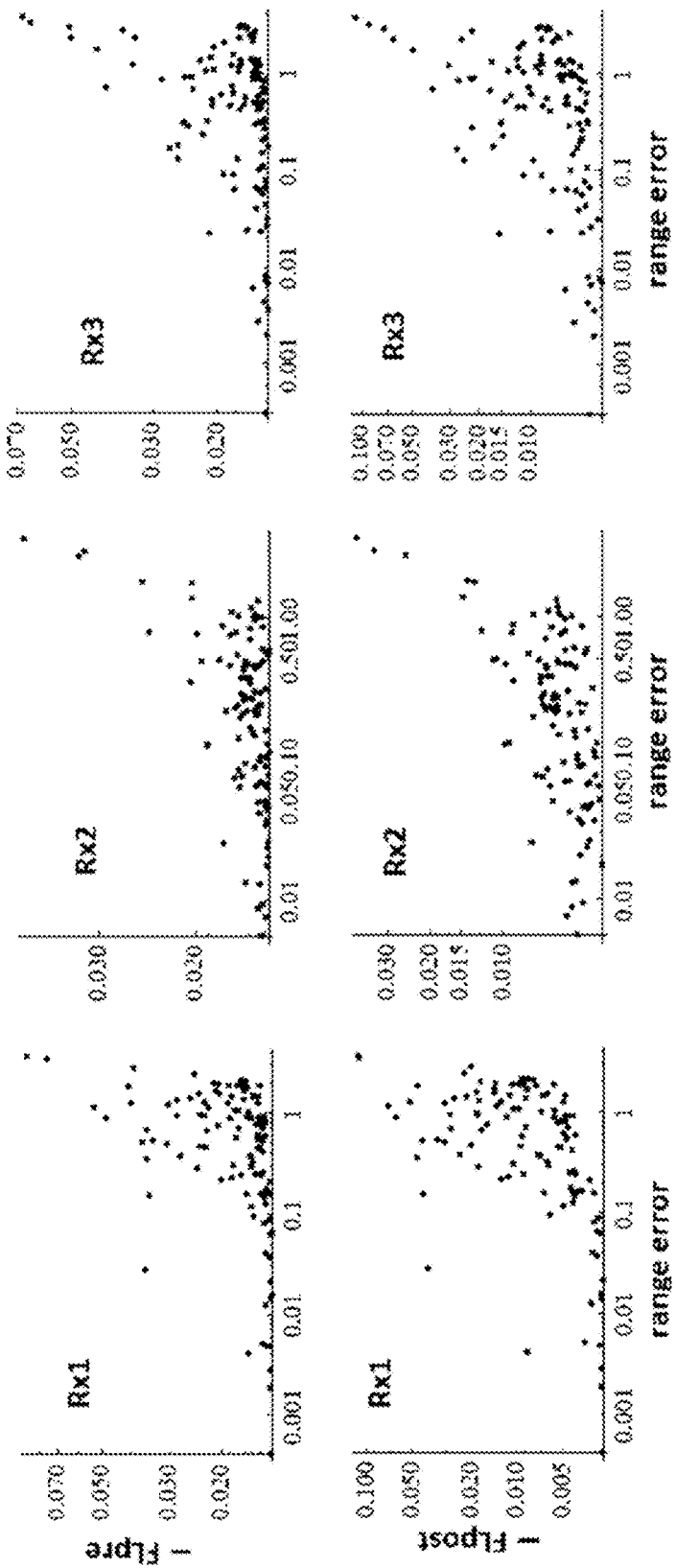

US 10,459,065 B2

INDOOR LOCALIZATION USING RECEIVED SIGNAL QUALITY WEIGHTS

TECHNICAL FIELD

The present disclosure relates to localisation methods and systems. In particular, but without limitation, this disclosure relates to methods and systems for determining the location of a target wireless device.

BACKGROUND

The absence of satellite signals in indoor environments has given way to the rise of indoor positioning and indoor navigation systems resulting in the indoor location market being estimated to reach $4.4 Billion by 2019.

Arguably, there is not currently a single, widely accepted solution that can achieve the desired accuracy at the required cost. One possible reason for this may be the varying requirements for indoor localisation systems, such as: applications, accuracy, size, battery life, maintenance, plug-n-play, mobility, etc.

GPS transformed the way that people navigate outdoors. Accurate indoor localisation has the potential to have a similar effect. This can provide the foundation for accurate location-aware services, such navigating through indoor environments or accessing local devices, on a wireless local area network (LAN). Such networks are commonplace, and accurate indoor localisation can greatly improve the value of such networks.

Indoor localisation is becoming increasingly important in the United States of America where the Federal Communications Commission (FCC) has mandated that cellular network operators accurately locate people calling 911. This previously only included outdoor localisation; however, in January 2015 the FCC introduced a requirement for indoor localisation. There is therefore a need for a more accurate means of determining the position of devices, particularly for use in indoor environments.

BRIEF DESCRIPTION OF THE DRAWINGS

Arrangements of the present invention will be understood and appreciated more fully from the following detailed description, made by way of example only and taken in conjunction with drawings in which:

FIG. 4(a) shows a log-log scatter plot of negative of spectral flatness both pre-compensation ($FL_{pre}$) and post-compensation ($FL_{post}$) as a function of ranging error when using received signal power conversion for the first anchor node;

FIG. 4(b) shows a log-log scatter plot of negative of spectral flatness both pre-compensation ($FL_{pre}$) and post-compensation ($FL_{post}$) as a function of ranging error when using received signal power conversion for the second anchor node;

FIG. 4(c) shows a log-log scatter plot of negative of spectral flatness both pre-compensation ($FL_{pre}$) and post-compensation ($FL_{post}$) as a function of ranging error when using received signal power conversion for the third anchor node;

DETAILED DESCRIPTION

Figure 1B:
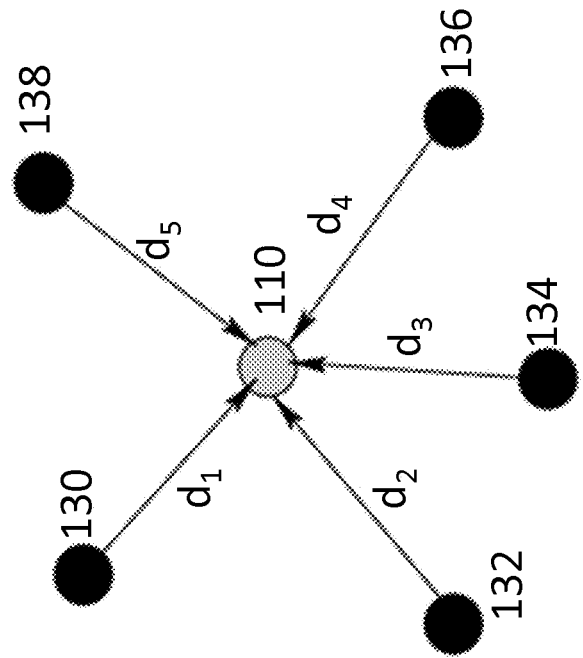
FIG. 1(b) shows an arrangement of anchor nodes and a target device in maximum likelihood multilateration localisation.

The location of a wireless device may be determined by combining information from wireless hotspots and, using estimates based on the received signal strength or the time (difference) of arrival, performing triangulation or trilateration or similar positioning techniques. Due to multipath fading and shadowing effects, background interference, and irregular signal propagation patterns, simplified path-loss or time of arrival models do not always hold and hence can inflict ranging accuracy errors in localisation estimates.

It is possible to utilise wireless (Wi-Fi) or cellular signals and perform time of arrival (ToA) location or similar signal processing analysis thereby enabling triangulation and trilateration of the position of a target device.

Often, more than three signals are available and so multilateration can be performed. Having said this, more signals does not necessarily translate to more accurate results, as many of these signals may be severely faded or have strong, and therefore misleading, non-line-of-sight components which can cause errors in the localisation procedure. Currently the preferred signals for use in localisation are: a) signals forming a convex hull (envelope) around the device to be localized (the target device); and, b) strong signals. The latter is based on the hypothesis that stronger signals are less contaminated by fading and noise and so can lead to more accurate localisation.

Ultrawideband (UWB) radio has a great potential for accurate ranging and localisation systems due to its very wide bandwidth and capability in resolving individual multipath components. Therefore, the time of arrival (ToA) of a received signal can be estimated with high accuracy for UWB systems if the first arriving path has been identified precisely. One of the major challenges for localisation systems is the mitigation of non-line-of-sight (N LOS) effects, such as specular reflection and shadowing.

Existing smartphones cannot support UWB ranging functions such as ToA or similar due to hardware and software limitations, and so typically only rely on received signal strength (RSS) information. On-board accelerometer data and other inertial measurement unit (IMU) data may be combined with the above techniques along with some Kalman or particle filter optimization methods (or other machine learning algorithms) to improve performance.

Another localisation method is that of fingerprinting which relies on radio frequency (RF) maps stored and updated on a server and the use of extensive pattern matching methods.

The approaches described herein determine the location of a target device based on the range (the distance) of the target device from a number of anchor nodes of known location. Arrangements utilise received signal quality indicators to apply weighting to the respective distances so that more reliable signals are favoured when the position of the target device is determined.

The received signal quality of a connection between two devices (of a given channel) represents the amount of degradation or interference that is picked up during transmission across the channel. This can represent the transmission time, loss, signal-to-noise ratio, crosstalk, echo, interrupts, frequency response, loudness levels, etc. As discussed later, the strength of the received signal is not a received signal quality indicator as it does not indicate how much distortion has been picked up over the channel, and instead merely indicates the overall strength of the signal (which may be comprised of a large amount of distortion/noise). Even strong signals that appear to have originated from a nearby device may have a large amount of distortion as they may result from nearby reflections and may not represent the direct line of sight transmission between the two devices.

Note that "distance" and "range" will often be used interchangeably. Similarly, the terms "frames" and "packets" may be used interchangeably herein.

Range-Base Localisation

Range-based localisation algorithms involve a step whereby the device to be localized (the target device) receives wireless signals from anchor nodes with attached information regarding the transmit power $P_T$, the modulation scheme being used and known location information (e.g. the coordinates of the anchor nodes relative to a given reference point). This information, along with the received signal power metrics that are readily available in most commercial devices, can be used to estimate the distance d between a transmitting device and the target device that receives the transmitted signal. The may be achieved using the Friis equation, since the received signal strength indicator (RSSI) and the received channel power indicator (RCPI) are proportional to the received power $P_R$:

$$P_R = P_T G_T G_R \left(\frac{\lambda}{4\pi d}\right)^\eta$$

where $G_T$ and $G_R$ are the antenna gains at the transmitter and receiver, $\lambda$ is the centre wavelength of the received signal, and $\eta$ is the path loss exponent which is usually between 2 and 4 and can be fitted experimentally for different environments. The Friis equation therefore describes the relationship between received signal power and the distance travelled by the signal. The transmission distance can therefore be derived from the power of the received signal. The transmission information (such as transmission gain, wavelength, etc.) may be included in the signal, or may be predefined according to a standard and stored by the receiving device for use in determining the distance to the transmitter.

Further variants to the Friis equation exist which may include other effects such as shadowing, antenna height, absorption or polarization. Such equations can be derived from, for instance, the Okumura model, the Hata model or the Young model for radio propagation.

Using the calculated distance d from three or more anchor nodes, the device then attempts to localize itself by either looking at the intersection of three circles (often referred to as trilateration), or by minimising the mean squared error between the calculated distances d and the distances from the estimated position to the anchors (often referred to as maximum likelihood multilateration).

In an alternative arrangement, only two anchor nodes may be utilised with each anchor node transmitting multiple signals at multiple transmit powers to help refine the estimate of the target location.

Figure 1A:
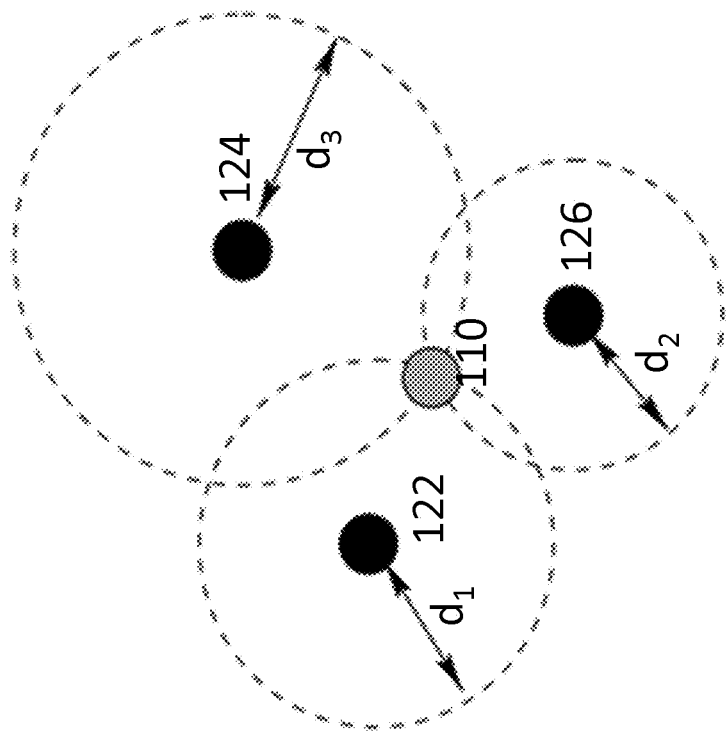
FIG. 1(a) shows an arrangement of anchor nodes and a target device in trilateration localisation.

FIG. 1(a) shows an arrangement of anchor nodes and a target device in trilateration localisation. FIG. 1(b) shows an arrangement of anchor nodes and a target device in maximum likelihood multilateration localisation. Trilateration determines the location of a target device based on the estimated distance from three anchor nodes 122, 124, 126. The distance to each anchor node 122, 124, 126 is determined, for instance, via the Friis equation, to define circles of common distance (loci) encircling the anchor nodes 122, 124, 126. The intersection(s) of the loci is/are used to determine the location of the target device 110.

In the arrangement shown FIG. 1(a), the loci all intersect at a single point which is determined to be the position of the target device 110. Having said this, errors in the calculated distances may result in no single intersection between all three loci. The location of the target device may then be determined based on the intersections between subsets of the loci, e.g. via the mean position of the intersections.

Maximum likelihood multilateration utilises a number of anchor nodes 130-138 to estimate the maximum likelihood position of the target device 110. This is achieved by calculating the distances $d_i$ based on the respective received signals. The maximum likelihood position is then determined to be the position that minimises the mean squared errors between the calculated distances $d_i$ and the corresponding estimated distances from the estimated position to the anchors 130-138.

Having said this, signal propagation in cluttered environments can result in distorted signals, for instance, due to shadowing or reflections. This is particularly the case for indoor transmission; however, may also apply outdoors, for instance, in cities where a large number of buildings can cause distortions. Obstructions can prevent signals taking the most direct route from anchor nodes to the target node. This can result in reflected signals being erroneously deemed to be the direct signal from an anchor node. For instance, it can often be the case that a strong received power value is recorded even though the signal has no line-of-sight (LOS) component, i.e. there is a strong specular component. In this case, the range would be significantly overestimated as reflected signals will have travelled further than the direct distance between the anchor node and the target device. This can lead to inaccurate derived distances and therefore can result in an incorrect position being determined for the target device.

As an alternative to range-based methods, the angle of arrival (AoA) of each signal may be utilised to determine the position of the target device. AoA methods are equally susceptible to errors caused by the distortion of signals.

The arrangements described herein therefore utilise weights to minimise the effect of such distortion on the determined position of the target device.

Weights

In the case of more than three anchor signals being available at the device to be localised, trilateration needs to choose which three signals to use. These may be ordered in accordance with decreasing received signal power ($P_R$) (i.e. the strongest received signals are favoured).

In the case of the maximum likelihood multilateration method, weights can be incorporated to account for the uncertainty of estimated distances. These weights may be proportional to the $P_R$ values from each anchor beacon.

Applying weights based on received signal power can result in an inaccurate position being determined. Some signals that result from reflections from a nearby anchor node may be stronger than direct signals from anchor nodes that are further away. This can therefore lead to reflected signals being given a larger weight than some direct signals, thereby leading to an inaccurate location being determined.

By looking at the output of the receiver demodulator, arrangements described herein utilise received signal quality (RSQ) metrics such as constellation symbol distortion and spectral flatness to offer further insight into the fading of the received signals which are not adequately captured by received power alone and hence can be used to assign better weights for localisation methods such as maximum likelihood multilateration, trilateration and angle of arrival. This allows any interference or distortion to be taken into account when determining the location of a target device, thereby resulting in a more accurate localisation method, especially for use in regions with a large amount of obstructions, such as indoor environments.

According to a first arrangement there is provided a system for determining the location of a target device relative to a set of anchor nodes having known locations in an environment wherein the line of sight between the target device and one or more of the anchor nodes is impeded. The system is configured to, for each anchor node: receive a signal transmitted between the anchor node and the target device; determine, based on the signal, an estimate of the distance between the target device and the anchor node or an estimate of the angle of arrival of the signal to the target device; determine a received signal quality indicator based on the signal; and, assign a weight for the signal based on the received signal quality indicator. The system is further configured to determine the position of the target device based on the estimated distances or angles of arrival, the corresponding weights and the locations of the anchor nodes.

Received signal quality indicates the confidence in the accuracy of the distance or angle of arrival for a given signal. It therefore indicates the amount of distortion that the signal has undergone during transmission over the channel (i.e. between transmission and receipt). It can also be considered a metric of the quality of service (QoS) provided to the target device. By utilising weights based on the received signal quality, the system takes into account the amount of distortion that the signal has been subject to and therefore provides a more accurate estimate of the location of the target device.

The location may be determined either based on estimated distances to the anchor nodes, or based on estimated angles of arrival for the signals. In one arrangement, a first estimate of the position is determined based on estimated distances, and a second estimate of the position is determined based on angles of arrival. A combined estimate for the position of the target device may then be obtained based on the two estimates, for instance, by taking the average of the two estimated positions. Equally, an average position may be determined based on estimated positions determined using: different modulation schemes, different multiplexing technologies, different transmit powers, and/or different weights.

The location of the target device may be determined by means of iterative improvements, for instance, via a Kalman filter (based at least partly on a previous determined location of the target device).

The location of anchor nodes may be transmitted in the respective signals or stored in memory of system and retrieved based on, for instance, respective node identifiers received in the signals. The anchor nodes may be wireless access points, cell towers or any other type of wireless radio transceiver.

In one arrangement the received signal quality indicator for each signal is based on a received symbol distortion and/or a spectral flatness of the signal. These are effective received signal quality indicators. The spectral flatness may be determined based on the signal prior to the signal being equalised and/or based on the signal after the signal has been equalised.

In one arrangement, the received signal quality indicator for each signal is based on a received symbol distortion and the received symbol distortion is based on the mean squared error of the received symbol relative to an expected symbol. The expected symbol may be the closest symbol in the constellation to the received signal (in a constellation diagram).

In one arrangement the received signal quality indicator for each signal is based on a received symbol distortion, the signal comprises an expected symbol and the received symbol constellation distortion is estimated based on the distortion relative to the expected symbol. Accordingly, a training sequence may be used to define the expected symbol for the calculation of the mean squared error of the signal.

In one arrangement each weight is calculated as a function of one or more of the mean squared error of the respective received symbol in a constellation diagram, the spectral flatness of the respective received signal and the spectral flatness of the respective received signal after it has been equalised. Where the location is calculated based on the estimated distance to each anchor node, each weight may be calculated as a function of the squared inverse of one or more of these parameters. Where the location is calculated based on the estimated angle of arrival of each signal, the each weight may be calculated as a function of the one or more of these parameters squared.

In one arrangement the position of the target device is determined based on the distances between the target device and the anchor nodes, and the weight $w_i$ for each signal is:

$$w_i = \frac{1}{d_i^2 FLpost_i^2}$$

wherein $d_i$ is the estimate of the distance for the signal and $FLpost_i$ is the spectral flatness of the received signal after is has been equalised.

In one arrangement the position of the target device is determined based on the distances between the target device and the anchor nodes, and the position of the target device is determined via trilateration or weighted maximum likelihood multilateration.

In one arrangement the position of the target device is determined based on the distances between the target device and the anchor nodes, and the distances are determined based on an indication of the strength of the received signal and/or based on the time of arrival of the signal. The indication of the strength of the received signal may be the received signal strength indicator (RSSI) or the received channel power indicator (RCPI). The where the strength of the signal is used, the distance may be determined via the Friis equation. Where the time of arrival is used, the distance may be determined based on the time difference of arrival (TDoA). If both the strength of the signal and the time of arrival are used to determine respective estimates for the distance, a combined estimate of the distance may be determined by taking the average of two distance estimates.

In one arrangement the system consists of the target device, wherein the target device is configured to receive the signals from the anchor nodes. Alternatively, the system may comprise the anchor nodes, wherein each of the anchor nodes is configured to receive the respective signal from the target device and the location of the target device is determined by one of the anchor nodes or by a further device forming part of the system. For the first option, the target device may comprise a controller which is configured to perform all of the steps required to determine the location of the target device based on the received signal. For the second option, the distances to the target device (or the angles of arrival) and the received signal quality indicators may be determined by the respective anchor nodes which then transmit the distances/angles of arrival and received signal quality indicators to a further device (e.g. a server) or a selected one of the anchor nodes to allow the determination of the target location. Alternatively, the signals may be forwarded directly to the server (or anchor node) which determines the distances (or angles of arrival), RSQ metrics and target location.

According to a further arrangement there is provided a method for determining the location of a target device relative to a set of anchor nodes having known locations in an environment wherein the line of sight between the target device and one or more of the anchor nodes is impeded. The method comprising a system, for each anchor node: receiving a signal transmitted between the anchor node and the target device; determining, based on the signal, an estimate of the distance between the target device and the anchor node or an estimate of the angle of arrival of the signal to the target device; determining a received signal quality indicator based on the signal; and, assigning a weight for the signal based on the received signal quality indicator. The method further comprises the system determining the position of the target device based on the estimated distances or angles of arrival, the corresponding weights and the locations of the anchor nodes.

In one arrangement the received signal quality indicator for each signal is based on a received symbol distortion and/or a spectral flatness of the signal.

In one arrangement the received signal quality indicator for each signal is based on a received symbol distortion and the received symbol distortion is based on the mean squared error of the received symbol relative to an expected symbol.

In one arrangement each weight is calculated as a function of one or more of the mean squared error of the respective received symbol in a constellation diagram, the spectral flatness of the respective received signal and the spectral flatness of the respective received signal after it has been equalised.

In one arrangement the position of the target device is determined based on the distances between the target device and the anchor nodes, and the weight $w_i$ for each signal is:

$$w_i = \frac{1}{d_i^2 FLpost_i^2}$$

wherein $d_i$ is the estimate of the distance for the signal and $FLpost_i$ is the spectral flatness of the received signal after is has been equalised.

In one arrangement the position of the target device is determined based on the distances between the target device and the anchor nodes, and the position of the target device is determined via trilateration or weighted maximum likelihood multilateration.

In one arrangement the position of the target device is determined based on the distances between the target device and the anchor nodes, and the distances are determined based on an indication of the strength of the received signal and/or based on the time of arrival of the signal.

In one arrangement the system consists of the target device, wherein the target device receives the signals from the anchor nodes, or the system comprises the anchor nodes, wherein each of the anchor nodes receives the respective signal from the target device and the location of the target device is determined by one of the anchor nodes or by a further device forming part of the system.

This present application proposes the use of received signal quality (RSQ) metrics to help identify the best signals for localisation. Specifically, it has been found that:
1. the less distorted the constellation, the more accurate the range estimation; and
2. the flatter the signal, the more accurate the range estimation.

Arrangements described herein therefore utilise one or more of the following received signal quality (RSQ) statistics:
1. MSE: Mean squared error of the received modulated symbol with respect to the closest constellation point. This is equivalent to the mean squared of the error vector magnitude taken over each symbol.
2. FL: Spectral flatness, either:
    a. before compensation of the faded channel ($FL_{pre}$); or
    b. after compensation of the faded channel ($FL_{post}$).

The first statistic assumes that the signal received from the anchor node has been modulated via a quantised digital modulation scheme to reflect a given symbol. Arrangements described herein utilise quadrature amplitude modulated (QAM) symbols, although other modulation schemes may be used. The greater the mean squared error of the received symbol with respect to the closest constellation point (or the expected constellation point, where a predefined sequence of symbols is used) then the lower the weight that is assigned to the signal.

Spectral flatness provides a measure of how noise-like a given signal is. A flat signal, having high spectral flatness, has a power spectrum that is evenly distributed across a range of frequencies. A less flat signal, having low spectral flatness, has peak(s) in its power spectrum. Orthogonal frequency division multiplexing (OFDM) transmits a relatively flat signal, similar to a single rectangular window. Any distortion of the signal is therefore likely to result in spectral variations across the window and therefore a decrease in the spectral flatness. Spectral flatness is often converted into decibels ranging from a maximum of 0 for a perfectly flat signal, to $-\infty$ for a single tone.

Wireless systems regularly utilise equalisation to compensate for distortion incurred via transmission of a signal. The spectral flatness of this uncompensated signal ($FL_{pre}$) may be utilised, and/or the spectral flatness of the compensated signal ($FL_{post}$) may be utilised, when producing weights.

Both spectral flatness and constellation distortion are correlated with ranging errors. Accordingly, taking these statistics into account can improve the accuracy of range-based localisation methods.

Figure 2:
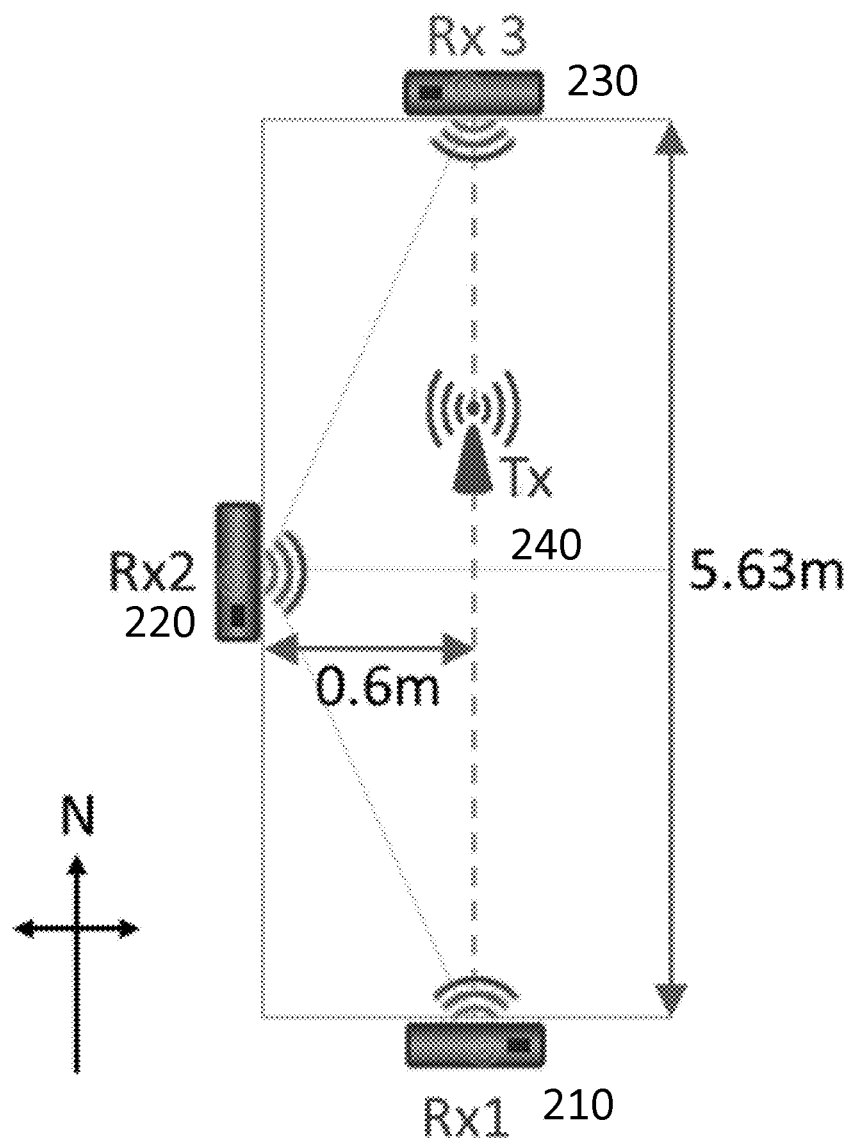
FIG. 2 shows three anchor nodes and a movable target node used to assess the correlation between received signal quality statistics and ranging errors.

To show the correlation between constellation distortion, spectral flatness and ranging error, three Universal Software Radio Peripherals (USRPs) pairs, spaced at known distances, were used to measure the:
 a. received signal power ($P_R$),
 b. received constellation symbol distortion (MSE), and
 c. spectral flatness ($FL_{pre}$, $FL_{post}$),
of orthogonal frequency-division multiplexed (OFDM) packets transmitted by another (target) USRP as illustrated in FIG. 2.

FIG. 2 shows three anchor nodes 210, 220, 230 and a movable target node 240 used to assess the correlation between received signal quality statistics and ranging errors. The anchor nodes were configured to receive a signal from the target node. The antennas for all of the nodes were positioned 1 m above the floor. The first 210 and third 230 anchor nodes were positioned 5.63 m from each other. The second anchor node 220 was positioned half way between the first and second anchor nodes 210, 230 and 0.6 m transversally from the axis stretching between the first and second anchor nodes 210, 230.

The target node 240 was moved along a line between the first and third anchor nodes 210, 230 and the above measurements were taken at the known positions of the target node 240. The received signal power for each position was utilised to determine an estimated position, and correlation scatter-plots to show the correlation between constellation distortion, spectral flatness and ranging error (i.e. the difference between the estimated and measured positions of the target node 240).

Figure 3A:
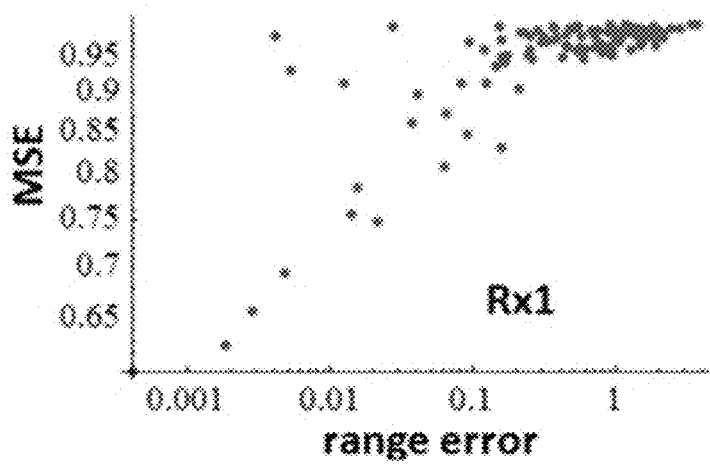
FIG. 3(a) shows a log-log scatter plot of mean squared error against ranging error when using received signal power conversion for the first anchor node.
Figure 3B:
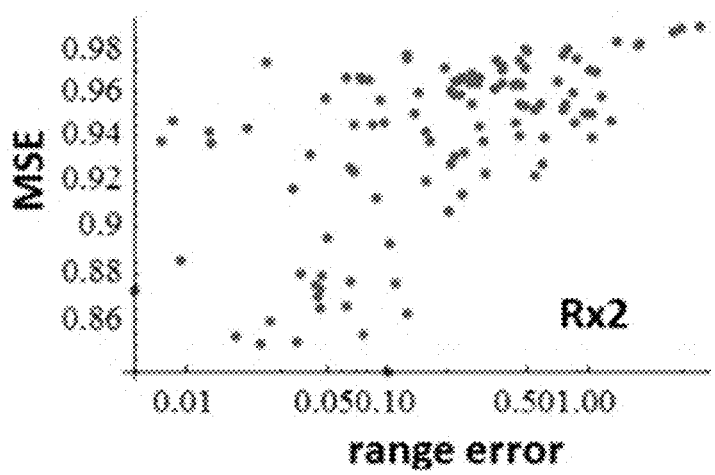
FIG. 3(b) shows a log-log scatter plot of mean squared error against ranging error when using received signal power conversion for the second anchor node.
Figure 3C:
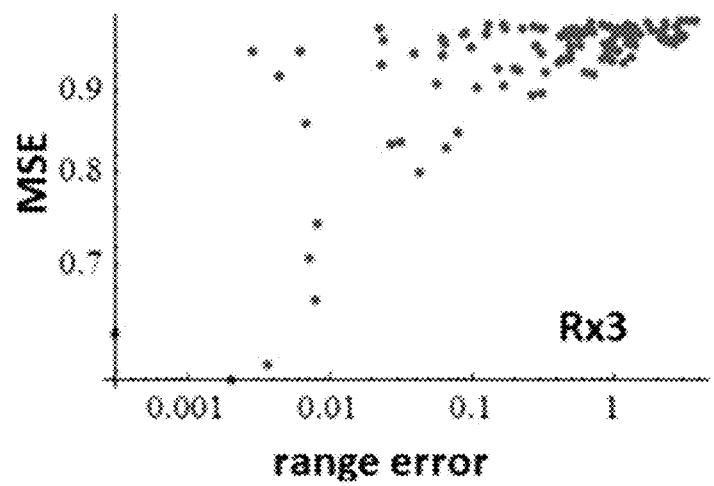
FIG. 3(c) shows a log-log scatter plot of mean squared error against ranging error when using received signal power conversion for the third anchor node.

FIG. 3(a) shows a log-log scatter plot of mean squared error against ranging error when using received signal power conversion for the first anchor node. FIG. 3(b) shows a log-log scatter plot of mean squared error against ranging error when using received signal power conversion for the second anchor node. FIG. 3(c) shows a log-log scatter plot of mean squared error against ranging error when using received signal power conversion for the third anchor node. A clear correlation between the mean squared error of the received constellation symbols and the range error can be seen. That is, a small constellation distortion corresponds to smaller ranging errors when estimating distance using the received signal power.

FIG. 4(a) shows a log-log scatter plot of negative of spectral flatness both pre-compensation ($FL_{pre}$) and post-compensation ($FL_{post}$) as a function of ranging error when using received signal power conversion for the first anchor node. FIG. 4(b) shows a log-log scatter plot of negative of spectral flatness both pre-compensation ($FL_{pre}$) and post-compensation ($FL_{post}$) as a function of ranging error when using received signal power conversion for the second anchor node. FIG. 4(c) shows a log-log scatter plot of negative of spectral flatness both pre-compensation ($FL_{pre}$) and post-compensation ($FL_{post}$) as a function of ranging error when using received signal power conversion for the third anchor node.

A clear correlation between the spectral flatness (both pre and post conversion/equalisation) and the range error can be seen. That is, flatter signals (displaying less negative spectral flatness) correspond to smaller ranging errors when estimating distance using the received signal power.

It should be noted that FIGS. 4(a)-4(c) and 5 show that ranging measurements can very often have an error of more than 1 meter. This is significant as the longest distance measured in this set of results was about 5 meters. This means that the ranging had errors of more than 20%. Accordingly, arrangements that take into account received signal quality can achieve accuracy improvements of a similar magnitude.

In light of the above, the mean squared error of the received constellation symbols and spectral flatness are both strong indicators of the reliability of a received signal for the purposes of estimating a target location. Both of these statistics are readily available to most consumer wireless devices and so can improve accuracy for many localisation methods such as trilateration, multilateration, time difference of arrival or angle of arrival. This can improve localisation accuracy by up to 37% over unweighted localisation methods.

Weighted Maximum Likelihood Multilateration

One arrangement utilises a received signal quality indicator in a weighted maximum likelihood multilateration method.

Figure 5:
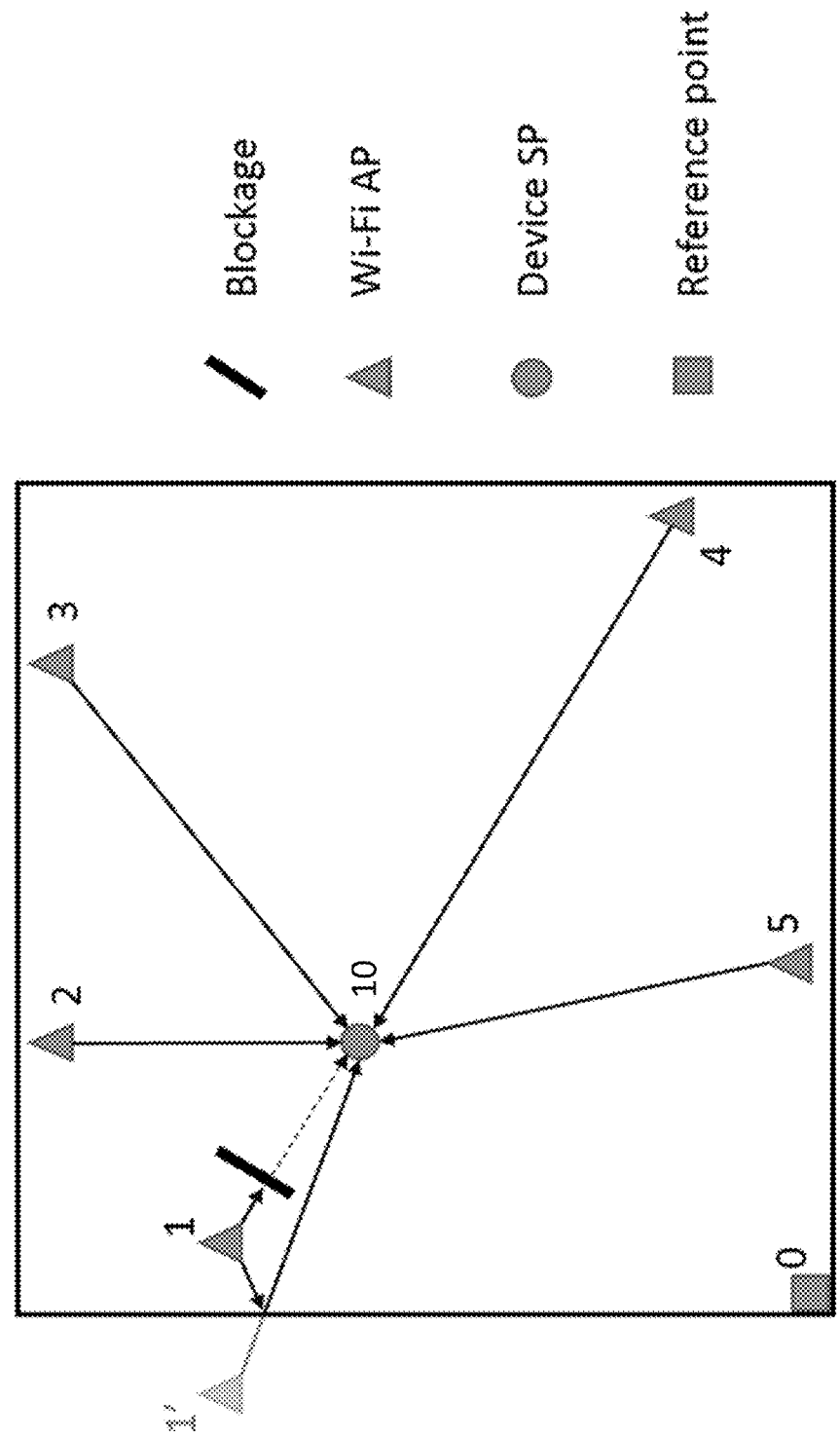
FIG. 5 shows an arrangement utilising multilateration where the signal from one anchor node is blocked.

FIG. 5 shows an arrangement utilising multilateration where the signal from one anchor node is blocked. The network comprises a set of anchor nodes 1-5 having their own predefined identification numbers (i={1,2,3,4,5}). In the present arrangement, the anchor nodes 1-5 are Wi-Fi access points (AP) in accordance with one of the IEEE 802.11 protocols. Each anchor node is located at a known coordinate ($x_i$,$y_i$) relative to a reference point 0. The whole network is contained within a rectangular room.

The target node 10 is a smartphone (SP) that is configured to detect wireless (in this case, Wi-Fi) signals from the anchor nodes 1-5. Accordingly, the target node 10 is a wireless station in accordance with one of the IEEE 802.11 protocols.

At random intervals, each anchor node 1-5 broadcasts OFDM packets, consisting of a header containing the unique ID number of the access point 1-5, which will be used for packet detection and channel estimation, and a payload, which includes null and pilot tones along with data containing information on the anchor node coordinates ($x_i$,$y_i$). Table 1 gives further details of an example OFDM system according to this arrangement.

TABLE 1 specifications for network in accordance with an arrangement.

| Parameter | Value |
| --- | --- |
| Total bandwidth | 1 MHz |
| QAM modulation ([constellation symbols]) | BPSK ([−1, 1]) |
| Subcarriers per OFDM symbol | 64 |
| Data subcarriers per OFDM symbol (N) | 48 |
| OFDM symbols per frame | 16 |
| Bits per frame | 768 |
| Cyclic prefix length | 16 |
| Antenna Tx Gain | 30 dB |
| OFDM symbols per burst | 88 |

The target node 10 receives these signals. The packets from each anchor node 1-5 are detected and determined. Any phase rotation caused by the differences in sampling time is corrected.

The target node 10 could use only the received signal strength (or received signal power) for each signal along with the coordinates of the corresponding anchor node 1-5 to determine its location. Having said this, it can be seen from FIG. 5 that, whilst anchor nodes 2-5 have line of sight with the target node 10, direct transmission to the target node 10 from anchor node 1 is obstructed by a blockage. The strongest signal received by the target node 10 from anchor node 1 would therefore be a reflection from the side wall. This would indicate an erroneous position for anchor 1 (indicated as 1').

This overestimation of the distance between anchor 1 and the target node 10 could lead to an erroneous target location being determined.

In light of the above, weights are assigned to each distance based on received signal quality parameters determined from the payload of the each received packet. The location of the target node 10 is then determined via weighted maximum likelihood multilateration. The weights take into account increased distortion that may be present in the signals thereby reducing the effect of, for instance, shadowing and reflection, thereby producing a more accurate estimate of the location of the target node 10.

Figure 6:
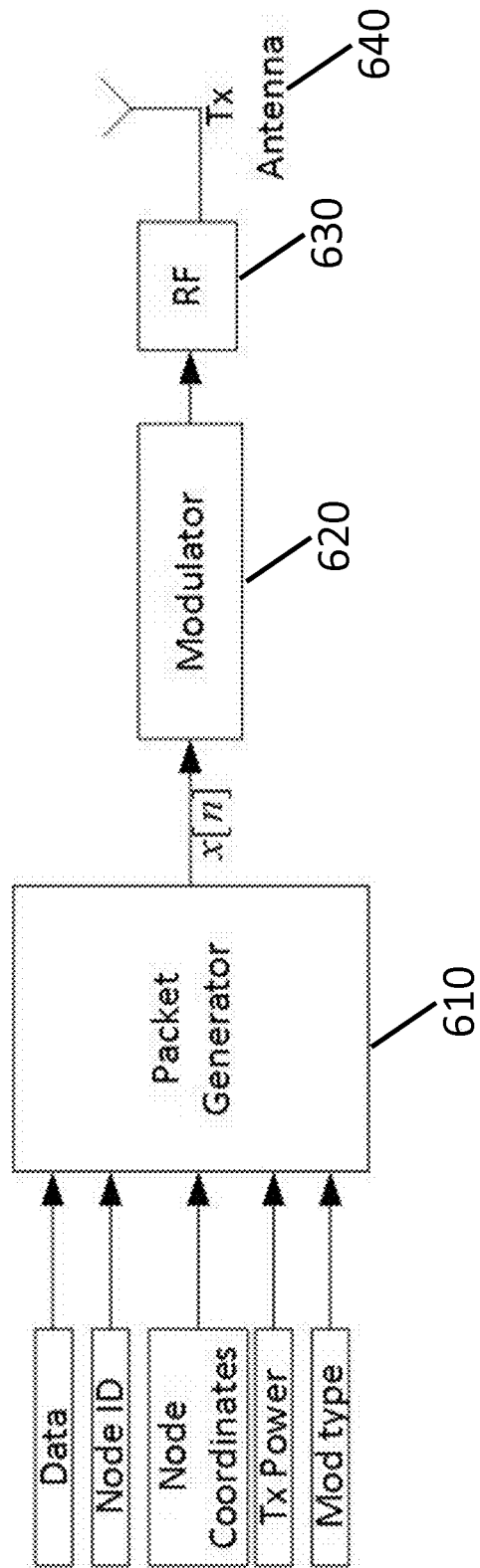
FIG. 6 shows processing blocks for the anchor nodes (transmitters, Tx) in the arrangement of FIG. 5.

FIG. 6 shows processing blocks for the anchor nodes (transmitters, Tx) in the arrangement of FIG. 5. The data to be transmitted is received by the transmitter 610, along with the node ID, the node coordinates, the transmit power and the modulation type for the signal. The packet generator 610 combines all the data and node information, it also maps the information to symbols x[n] (bits to complex symbols). The node information and data may be split between a header and payload.

The packet is then modulated 620, in the present arrangement orthogonal frequency division multiplexing (OFDM) is utilised, with a cyclic prefix added; however this could simply comprise passing the symbols through, or spreading them, if using code division multiple access (CDMA).

The signal is then prepared for radio frequency (RF) transmission in the RF block 630. This may include pulse shaping (not in OFDM case), up-conversion to radio frequency (RF) and amplification. The signal is then passed through the Tx antenna 640 to transmit the signal.

Figure 7:
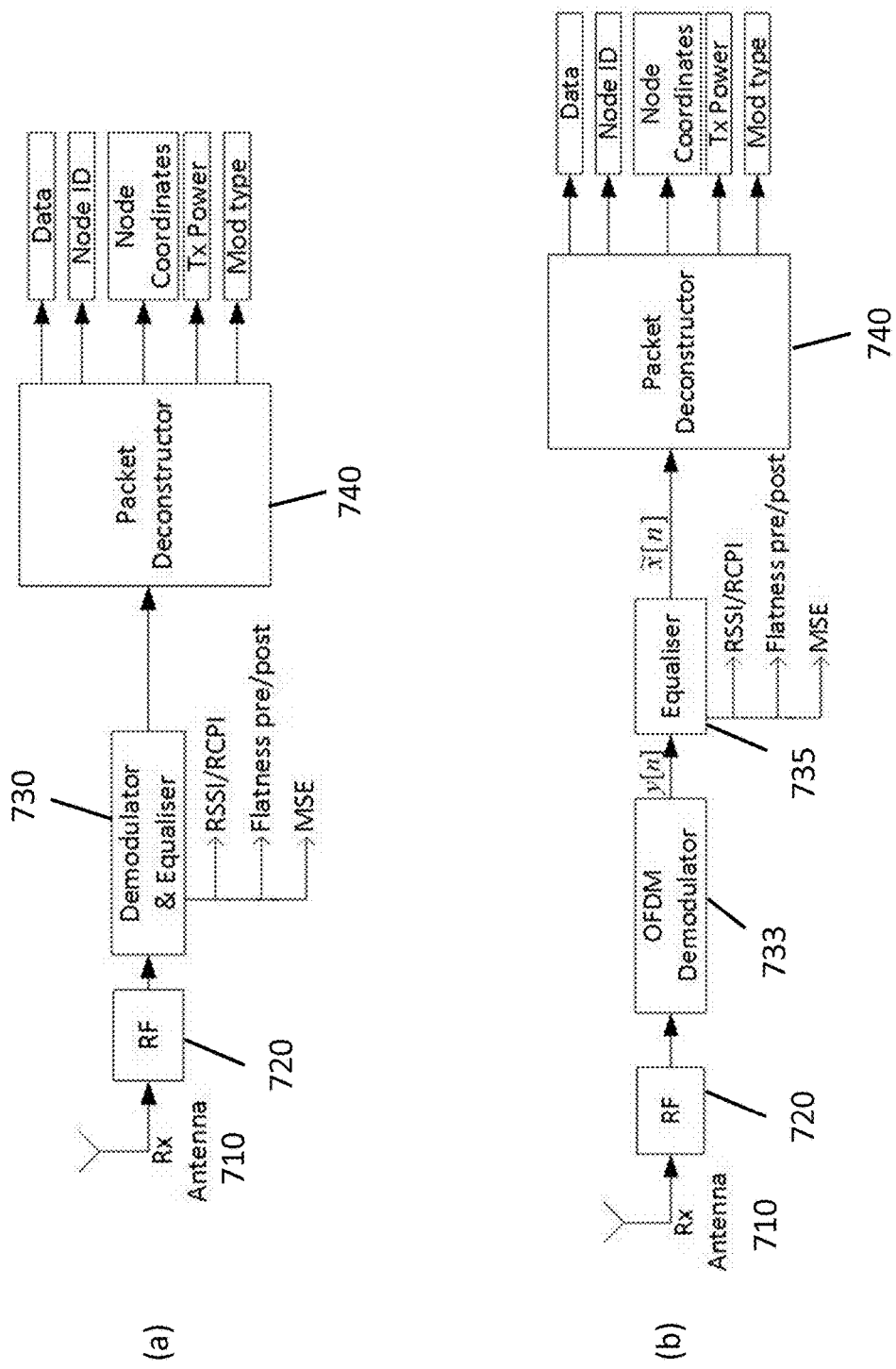
FIG. 7 shows processing blocks for the target node (receiver, Rx) in the arrangement of FIG. 5.

FIG. 7 shows processing blocks for the target node (receiver, Rx) in the arrangement of FIG. 5 for: (a) a general system; and, (b) an OFDM system.

For the general system (a) the RF signal is received 710 at the target node and down converted and filtered in the RF block 720. The demodulator & equaliser block 730 recovers the complex constellation symbols. This may involve passing the signals through an OFDM receiver, and then an equaliser (OFDM); or through an equaliser and dispreading the signal (CDMA); or just through an equaliser (conventional uncoded modulation). It is in this block where the received-signal quality metrics are estimated.

It should be noted that the RSQ may be based on the either the corrected or precorrected signal. The RSSI/RCPI is estimated first, followed by the spectral flatness of the signal before (flatness_pre) and after (flatness_post) the equaliser. Finally the mean squared error (MSE) is estimated from the complex symbol outputs of the equaliser. These complex symbols are then passed on to the packet deconstructor 740, where the complex symbol to bit mapping is done, and the data and source node information (node ID, node coordinates, transmit power and modulation type) are extracted.

For the OFDM system (b), the processing is the same as above, however, the demodulator 733 and equaliser 735 are separated to show the unequalised subcarrier complex symbols y[n], from which RSSI and flatness_pre are estimated, and the equalised subcarrier complex symbols from which flatness_post and MSE are estimated.

As shall be discussed below, the received signal may include information relating to the transmission of the signal and the location of the transmitting anchor node. This information may be determined from the corrected signal via the packet deconstructor. Alternatively, the transmission information may be predefined and therefore known by the target device signal (stored in memory of the target device). This avoids the need to provide the transmission information in the signal.

Figure 8:
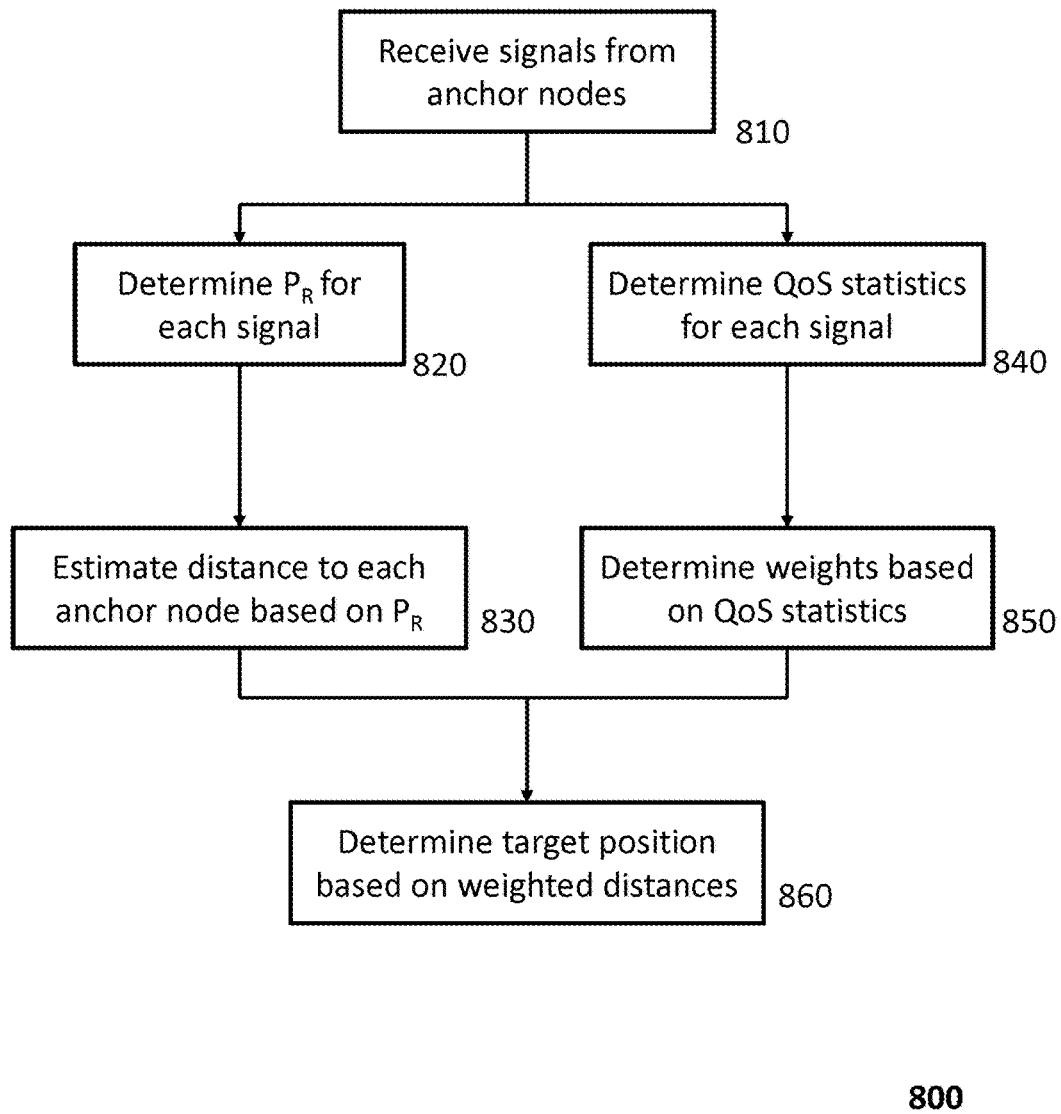
FIG. 8 shows a flow diagram for a method of determining a target location.

FIG. 8 shows a flow diagram for a method 800 of determining a target location via the receiver of FIG. 7.

The target device first receives i signals from the anchor nodes 810. The strength of the received signals is used to determine the received power $P_R$ for each signal 820. This is the average power of the demodulated signal (pre-equalisation) across the received frame:

$$P_R = \frac{1}{N}\sum_{n=0}^{N}|y[n]|^2$$

In the present arrangement, the received signal power ($P_R$) is estimated in a similar manner to the received channel power indicator (RCPI) commonly used in Wi-Fi, where the signal power is estimated over the entire frame of the received signal. In an alternative arrangement, the RSSI, which estimates the received signal power from the preamble of the received frame, could also be used for estimating the received signal power.

The received power $P_R$ for each of the i signals is then utilised to estimate the distance $d_i$ between the target device and the respective anchor node 830. These distances may be determined using the Friis equation, or similar methods, as discussed above. Each signal contains information relating to the position of the anchor node that transmitted the signal. This information, along with the received power $P_R$ and the gain of the receiving antenna $G_R$, can be used to estimate the distance $d_i$ to the transmitting anchor node. The transmission information (for instance, transmit power $P_T$) may be transmitted with the signal or may be predefined and retrieved from memory.

The path loss exponent n utilised in the Friis equation may be predefined for all signals (set to the same value for all signals), may be transmitted from the anchor node to the target node along with the other information in the signal, or may be predefined and stored for each anchor node so that it may be retrieved by the target node based on the unique IDs contained in each signal. The path loss exponent η for each anchor node may be determined via an initial calibration exchange of data before being stored for later use.

The signal is also utilised to determine received signal quality statistics for each signal 840. As mentioned above, the RSQ statistics may include one or more of the mean squared error of the constellation symbols, and the spectral flatness.

The mean squared error (MSE) of a received constellation symbol is:

$$MSE = \frac{1}{N} \sum_{n=0}^{N} \frac{|\tilde{x}[n] - M[n]|^2}{|M_{Max}|^2}$$

where N is the number of data subcarriers in each OFDM symbol, M is the closest constellation point to x̃[n], (or the expected constellation point where a known training signal is used or where the expected constellation point is estimated from the output of a channel decoder), and |M$_{max}$| is the maximum amplitude of the constellation set, that is, the highest possible amplitude for a given subcarrier according to the constellation. In other words, the mean squared error of the received subcarrier values relative to the subcarrier values of the most likely (e.g. closest) corresponding constellation point is calculated. This is the mean squared error of the received symbol as represented in the corresponding constellation diagram.

In an alternative arrangement, the transmitted signal contains a predefined symbol. In this case, M is the expected predefined symbol.

The spectral flatness for the pre-equalised symbol (FLpre) and the equalised symbol (FLpost) are:

$$FLpre = 20\log_{10}\left(\frac{\exp\left(\frac{1}{n}\sum_{n=0}^{N}\log_e(|y[n]|)\right)}{\frac{1}{N}\sum_{n=0}^{N}|y[n]|}\right)$$

$$FLpost = 20\log_{10}\left(\frac{\exp\left(\frac{1}{n}\sum_{n=0}^{N}\log_e(|\tilde{x}[n]|)\right)}{\frac{1}{N}\sum_{n=0}^{N}|\tilde{x}[n]|}\right)$$

The RSQ statistics are utilised to determine weights $w_i$ for each signal/distance 850. In the present arrangement, the weights $w_i$ for each signal is the inverse of the mean squared error of the received constellation symbol, all squared $(1/MSE_i^2)$.

The estimated distances to the anchor nodes and the corresponding weights are then utilised to determine the target position 860. In the present arrangement this is determined via weighted maximum likelihood multilateration. The coordinates of the target device $\overline{(X,Y)}$ are determined according to:

$$\overline{(X,Y)} = \underset{(X,Y)}{\mathrm{argmin}}\left[\sum_{i=1}^{N}\left[w_i\left(\sqrt{(X-X_i)^2 + (Y-Y_i)^2} - d_i\right)^2\right]\right]$$

where x is the total number of received signals (the number of anchor nodes that are detected by the target node) and $X_i$ and $Y_i$ are the coordinates of the $i^{th}$ anchor node. In other words, the coordinates of the target node are determined by finding the coordinates that minimise the weighted mean squared error between the calculated distances $d_i$ and the distances from the coordinates (the estimated position) to the anchors.

The above arrangement utilises weights $w_i$ of $1/MSE_i^2$. Alternative weights include the inverse of the spectral flatness pre-equalisation squared $(1/FLpre_i^2)$, the inverse of the spectral flatness post-equalisation squared $(1/FLpost_i^2)$ and the inverse of the spectral flatness post-equalisation squared multiplied by the inverse of the distance squared $(1/d_i^e \, FLpost_i^2)$.

The latter of these weights $(1/d_i^2 FLpost_i^2)$ has been shown, using the arrangement of FIG. 2, to provide an improvement in the localisation accuracy of 37% over unweighted multilateration (e.g. w=1 for all signals). Having said this, the system of FIG. 2 provides clear line of sight between the receivers and the transmitter. Further performance increases are expected for scenarios where reflections, shadowing and multipath fading is more significant (such as the arrangement shown in FIG. 5).

All of the above proposed weights incorporate received signal quality indicators to take into account any multipath fading effects. This provides more reliable range measurements than those provided by weights that don't include received signal quality indicators. For instance, the weight may be the inverse of the distance to the anchor node squared $(w_i=1/d_i^2)$. This is on the basis that closer anchors provide more reliable range measurements. This, however, is a biased estimation that does not account for multipath distortions.

By basing the weights on received signal quality indicators, the weights are not based on biased estimates and are more sensitive to multipath fading effects. For instance, in the arrangement of FIG. 5, the signal from anchor node 1 is severely faded due to a specular reflection from the nearby wall, since the line of sight path is blocked. Whilst the received signal power from this anchor may be stronger than, for instance, that from anchor nodes 3, 4 or 5, it is likely to cause severe ranging errors. By using the received constellation symbol distortion (or an alternative RSQ) as part of a RSQ weight, the target node 10 can therefore achieve more accurate indoor localisation.

Whilst the above arrangement utilises the RCPI for each signal to estimate the distance to the transmitting anchor node, alternative arrangements may instead utilise the received signal strength indicator (RSSI), or any other indication of the strength of the received signal.

In a more general arrangement, weights are assigned according to $w_i=RSQ_i$ where $RSQ_i=g(MSE_i)$ and g(x) is a monotonically decreasing positive function of x.

In another arrangement, weights are assigned according to $w_i=RSQ_i$ where $RSQ_i=f(-FLpre_i,-FLpost_i,MSE_i,RSSI_i)$ where f is a monotonically decreasing positive function of its arguments.

In another arrangement, thresholds are defined such that weights which are less than such thresholds are set to zero, and hence are not included in the multilateration. This can be considered a "maximum trimmed likelihood estimator" since some data-points are trimmed, or excluded. This method can also be applied to trilateration, triangulation for angle of arrival (see below), time distance of arrival (TDoA), etc.

Trilateration

Figure 9A:
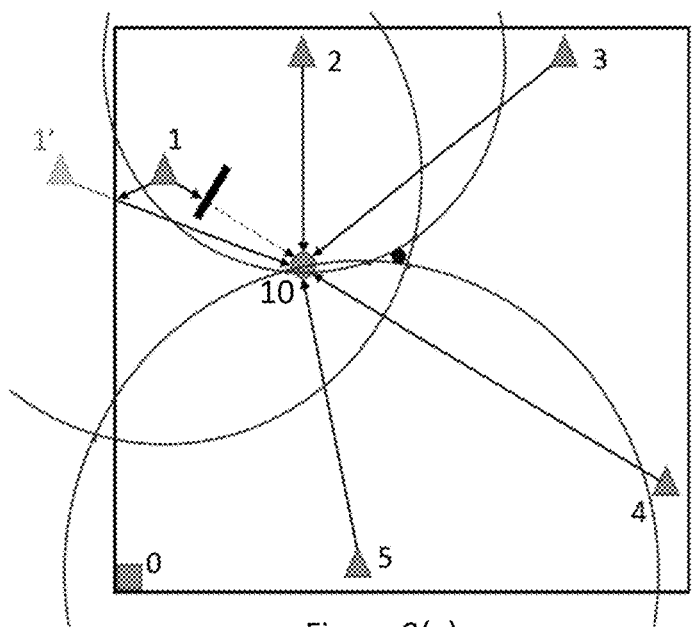
FIG. 9(a) shows an arrangement utilising trilateration using a first set of anchor nodes.
Figure 9B:
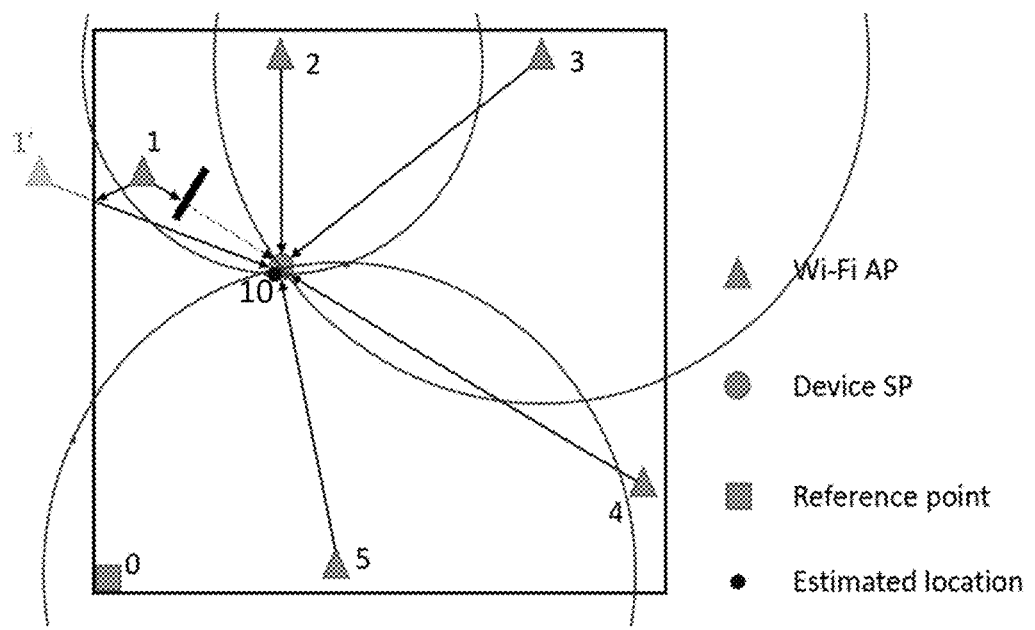
FIG. 9(b) shows an arrangement utilising trilateration using a second set of anchor nodes.

FIG. 9(a) shows an arrangement utilising trilateration using a first set of anchor nodes. FIG. 9(b) shows an arrangement utilising trilateration using a second set of anchor nodes. The arrangement of anchor nodes 1-5 and the target node 10 is the same as that shown in FIG. 5. The first set of anchor nodes comprises anchor nodes 1, 2 and 5. The second set of anchor nodes comprises anchor nodes 2, 3 and 5. The present arrangement applies the method of FIG. 8; however, the target position is determined using trilateration.

After the target node 10 has converted the power of the received signals to a range estimation $d_i$ between each anchor using the Friis equation (or similar), the target node formulates a trilateration problem in order to calculate its own coordinates $\overline{(X,Y)}$ relative to the reference point 0. One way of achieving this is to select the three best anchor nodes and find the intersection of the three circles as illustrated in FIG. 9(a). Due to ranging errors, however, there may be no common intersection between all three circles, and hence a weighted average is taken over all intersection points $P_{ij}$ from anchors i and j as described by the formula below:

$$\overline{(X,Y)} = \sum_{i<j} w_{ij} P_{ij} \bigg/ \sum_{i<j} w_{ij}$$

To select the three (apparently) closest anchor nodes, the weights could be set equal to 1 for the three nearest intersections and 0 otherwise. This may be based on the RSSI-obtained distances. In this case the estimated location would be as illustrated in FIG. 9(a). More measurements may be used at different powers etc. to improve the estimate; however the source of the error is in some cases due to a strong non-line-of-sight component from a nearby anchor (see, for instance, anchor 1 in FIG. 9(a)). Instead of this, the present arrangement sets the weights of each intersection point equal to $w_{ij}=f(MSE_i,MSE_j)$ where f(X,Y) is a monotonically decreasing positive function of X and Y where the indices i and j correspond to the pair of anchors which whose range circles intersect at coordinate $P_{ij}$. Hence the weights are not based on biased estimates and are more sensitive to multipath fading effects. Indeed, in the arrangement illustrated in FIG. 9(a), the signal from anchor node 1 is severely faded due to a specular reflection from the nearby wall since the line of sight path is blocked. Whilst the signal power from this anchor may be stronger than, for instance, that from anchor nodes 3, 4 or 5, it is likely to cause severe ranging errors.

By using the received constellation symbol distortion (or an alternative RSQ) as part of a RSQ weight the target node can therefore achieve more accurate indoor localisation. This not only allows the target node to better determine which three ranges to use when determining the intersection point(s), but also improves the weighted average that would be calculated where a single intersection point is not found.

In another arrangement of the above example, weights are assigned according to $w_i=f(MSE_i,MSE_j,-FLpre_i,-FLpre_j,-FLpost_i,-FLpost_j,RSSI_i,RSSI_i)$ where f is a monotonically decreasing positive function of its arguments.

The weights mentioned with regard to the maximum likelihood multilateration arrangements may also be utilised in trilateration.

Whilst the above arrangement utilises the RCPI for each signal to estimate the distance to the transmitting anchor node, alternative arrangements may instead utilise the received signal strength indicator (RSSI), or any other indication of the strength of the received signal.

Time of Arrival (ToA) and Time Difference of Arrival (TDoA)

The distance between two wireless antennae can be determined based on the round trip time for a message. Time of arrival (ToA) bases the distance on the time of arrival of signals with known velocity (such as electromagnetic waves through a known medium). Time difference of arrival (TDoA) bases the distance on the difference in the time of arrival at different nodes.

A major weakness of ranging measurements is their susceptibility to signal reflection, or multipath signals, where a signal does not take the most direct path from transmitter to receiver and the perceived distance is inflated.

ToA and TDoA rely on having time synchronization between devices. This is typically achieved either through global positioning systems (GPS) or from the core network. These measurements are then converted into distances which are used to multilaterate or trilaterate as described in the previous two sections.

Accordingly, in alternative arrangements, the distance to each anchor node is determined based on the time of arrival of the signals (e.g. via ToA or TDoA) instead of the received signal power. The position of the target node may be obtained using RSQ weighted multilateration or trilateration as discussed above.

Angle of Arrival Based Localisation

Whilst the above arrangements discuss range-based localisation, the proposed weighting method may also be applied to angle of arrival based localisation in which the position of the target device is determined based on the angle of arrival of the signals from the anchor nodes. Angle of arrival (AoA) methods identify the direction of arrival of an incoming RF signal. To achieve this, the receiving device is equipped with multiple antenna elements, and is aware of their relative spatial arrangement (stores data specifying the spatial arrangement of the antennae).

In the simplest case, two dipole antennae separated by half a wavelength can measure the Time Difference of Arrival (TDOA) of a signal and infer the incoming angle $\alpha$ of the signal, relative to the orientation of the antenna array.

Figure 10:
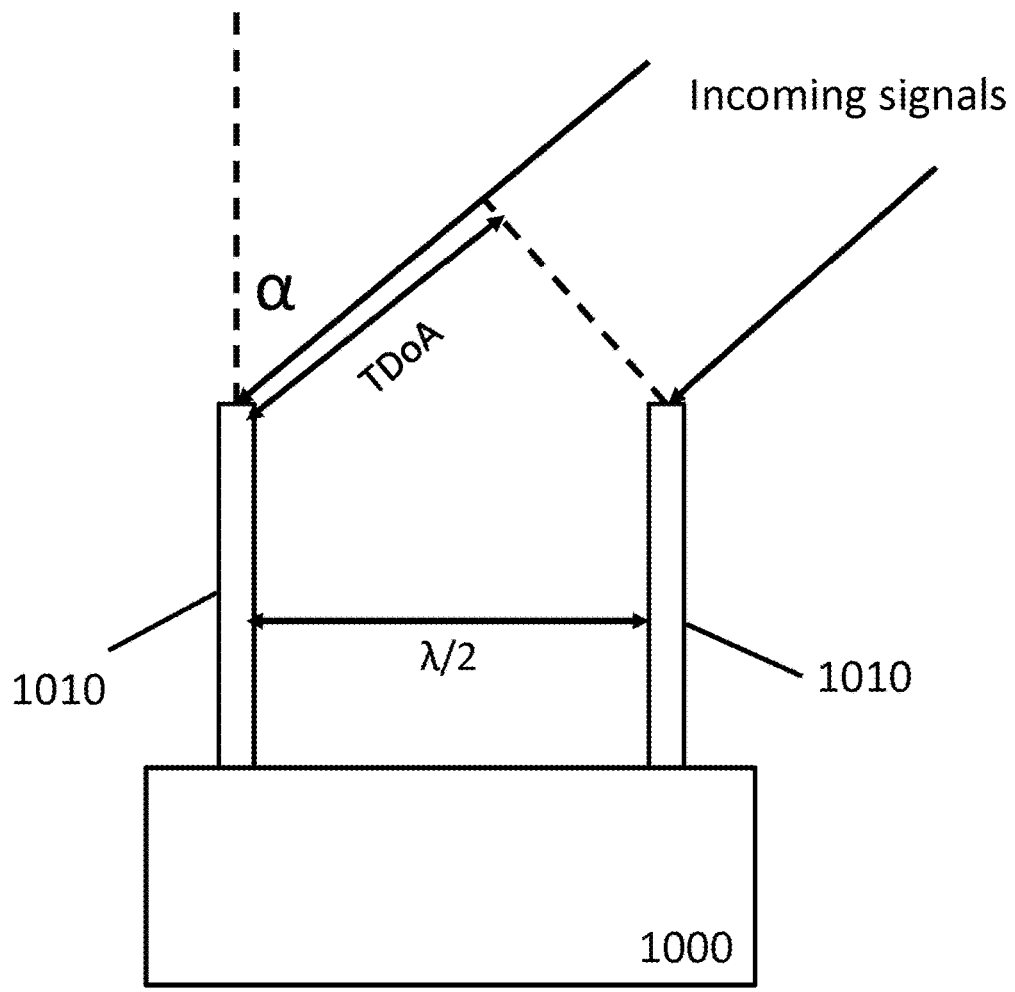
FIG. 10 shows a device for determining the angle of arrival of a signal.

FIG. 10 shows a device 1000 for determining the angle of arrival of a signal. The device 1000 comprises two antennae 1010 separated by half the wavelength ($\lambda/2$) of the RF signals to be received. When a signal is received, the device can measure the Time Difference of Arrival (TDOA) of the signal between the two antennae 1010 and infer the incoming angle $\alpha$ of the signal, relative to the orientation of the antenna array 1010.

Figure 11:
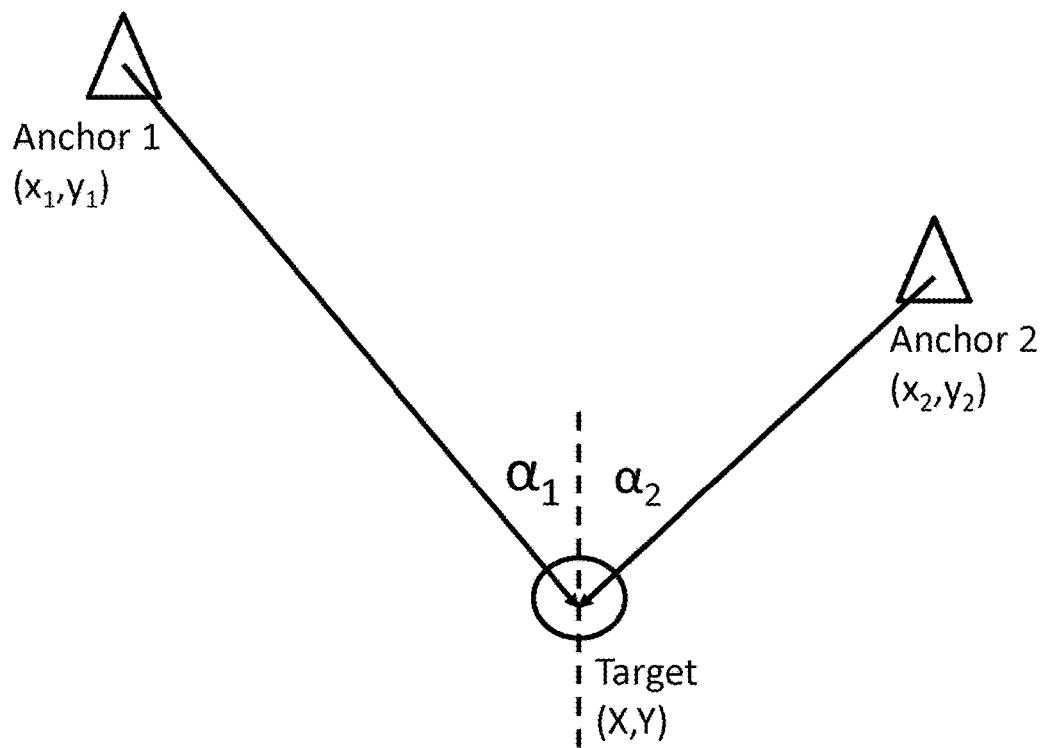
FIG. 11 shows an arrangement for determining the position of a target device based on the angle of arrival of signals.

If two or more such signals from different anchor nodes are received, and their respective AoAs are calculated, and the anchor node IDs and coordinates are also made available (either through a received transmission signal or through a database), then the target node can self-localize by finding the intersection of the straight lines representing the propagation paths of the signals, as shown in FIG. 11.

Assuming the radio noise is additive and Gaussian, errors may accumulate and so a maximum likelihood method, equivalent to a least squares approach may be adopted which typically improves in accuracy with the number of anchor nodes.

Below the AoA localization method using matrix notation is briefly described. Define $\alpha_i$ to represent the AoAs from n anchor nodes, and their corresponding coordinates by $(x_i,y_i)$ as shown in FIG. 11. Then the least-squares approach offers a solution which minimizes the sum of the squares of the errors in each of the n measurements $\alpha_i$. Namely, the system of linear equations is given by $$A \cdot c^T = b$$

where $$A = \begin{bmatrix} 1 & -\tan\alpha_1 \\ 1 & -\tan\alpha_2 \\ \vdots & \vdots \\ 1 & -\tan\alpha_n \end{bmatrix},$$

$$c = [X \quad Y] \text{ and } b = \begin{bmatrix} x_1 & -y_1\tan\alpha_1 \\ x_2 & -y_2\tan\alpha_2 \\ \vdots & \vdots \\ x_n & -y_n\tan\alpha_n \end{bmatrix}$$

The solution is therefore given by $$\hat{c} = ((A^T A)^{-1} A^T b)^T$$

Note, that this formulation is equivalent to a maximum likelihood formulation used previously for solving the multilateration problem. The weighted modification of the above is obtained by replacing A and b with:

$$A = \begin{bmatrix} m_1 & -m_1\tan\alpha_1 \\ m_2 & -m_2\tan\alpha_2 \\ \vdots & \vdots \\ m_n & -m_n\tan\alpha_n \end{bmatrix} \text{ and } b = \begin{bmatrix} m_1 x_1 & -m_1 y_1 \tan\alpha_1 \\ m_2 x_2 & -m_2 y_2 \tan\alpha_2 \\ \vdots & \vdots \\ m_n x_n & -m_n y_n \tan\alpha_n \end{bmatrix}$$

where the weights $m_i$ include the received signal quality metrics proposed herein (FL, MSE)

$$m_i = f(MSE_i, FL_{post_i}, FL_{pre_i}, RSSI_i)$$

where is f a monotonically increasing positive function of its arguments. Note that $m_i$ is inversely proportional to the weights $w_1$ used in previous arrangements.

The least-squares approach has inherent biases for AoAs close to 90 or 270 degrees due to the tangent function. The weights can be adapted to take into account these biases. In one arrangement utilising angle of arrival, the weight, $m_i$, is the received signal strength indicator divided by one minus the modulus of the tangent of the angle of arrival $\alpha_i$:

$$m_i = \frac{RSSI_i}{1 - |\tan\alpha_i|}.$$

Alternative weights include the received signal strength indicator multiplied by the spectral flatness pre-equalisation and divided by one minus the modulus of the tangent of the angle of arrival $\alpha_i$:

$$m_i = \frac{RSSI_i FL_{pre}}{1 - |\tan\alpha_i|},$$

the distance squared multiplied by the spectral flatness post-equalisation squared and divided by one minus the modulus of the tangent of the angle of arrival $\alpha_i$:

$$m_i = \frac{d_i^2 FLpost_i^2}{1 - |\tan\alpha_i|},$$

the received signal strength indicator multiplied by the mean squared error and divided by one minus the modulus of the tangent of the angle of arrival $\alpha_i$:

$$m_i = \frac{RSSI_i MSE_i}{1 - |\tan\alpha_i|},$$

or simply the mean squared error ($m_i = MSE_i$). All of these weights incorporate received signal quality indicators to take into account multipath fading effects during localisation.

Further Arrangements

There are many alternatives to the above arrangements. For example, the roles of transmitters and receivers can be reversed such that the target node broadcasts OFDM packets which are received by each anchor node (see, for example, the arrangement of FIG. 2). Each anchor node (or a central server) may then calculate the relative RSQ metrics and perform the conversion from received powers to distance (or estimate the angle of arrival). The nodes may then cooperate via a wired or wireless backhaul to formulate and solve the weighted maximum likelihood multilateration problem and inform the target node of its location.

In another arrangement the anchor nodes broadcast using different digital modulation schemes and the weights are appropriately adapted. Some modulation schemes may be more reliable than others and this may be taken into account in the weights assigned to each signal.

In another arrangement the anchor nodes broadcast using different multiplexing technologies and the weights are appropriately adapted. Some multiplexing technologies may be more reliable than others and this may be taken into account in the weights assigned to each signal.

In another arrangement the anchor nodes broadcast using different transmit powers and the weights are appropriately adapted.

In another arrangement the target position is determined many times using different weights and then the location is decided as an average centroid of the many solutions (an average location).

In another arrangement the target position is iteratively improved, for example, by keeping in memory previous estimates of location obtained through one weighting metric and then using these to improve the accuracy of more recent ones obtained through the same or a different weighting metric. For instance, at time t=0 localisation may be achieved by using weights based on MSE, and at t=1 using weights based on spectral flatness. At t=2 localisation can be achieved through the average of t=0 and t=1 estimates. This can help to improve the accuracy of the estimated target location.

Similarly, in another arrangement the target position is iteratively improved, for example, by taking an average over previous estimates of location obtained using different modulation schemes and/or transmit powers.

In another arrangement accuracy is improved through the use of a Kalman filter used to keep track of the estimated state of the system.

In one variant of the above processes, the device to be localized will query the network for its location and hence a number of signalling messages are exchanged prior to the range estimation which is typically based on the received signal power using the Friis conversion equation. The calculations may be performed centrally at a server, on each anchor or AP, or other devices and then sent back to the device to be localized in the form of a final or partial answered to be further processed by the device. Accordingly, the target nodes may calculate the distance (or angle of arrival), RSQ indicator(s) and weight for the received signal and then forward this on to a central server which determines the location of the target device. Alternatively, the received signals may be forwarded directly on to the central server and all processing steps may be performed by the central server.

In another variant of the above processes, the network will initiate the localisation query.

In another variant of the above processes, the anchor nodes can cooperate to localize a target node passively, that is, simply by analysing beacons received from the target node.

Whilst the above arrangements utilise Wi-Fi access points for anchor nodes, the methods described herein are equally applicable to general radio signals that have been received, for instance, from cell towers. Accordingly, arrangements are equally applicable to outdoor range-based localisation methods.

Figure 12:
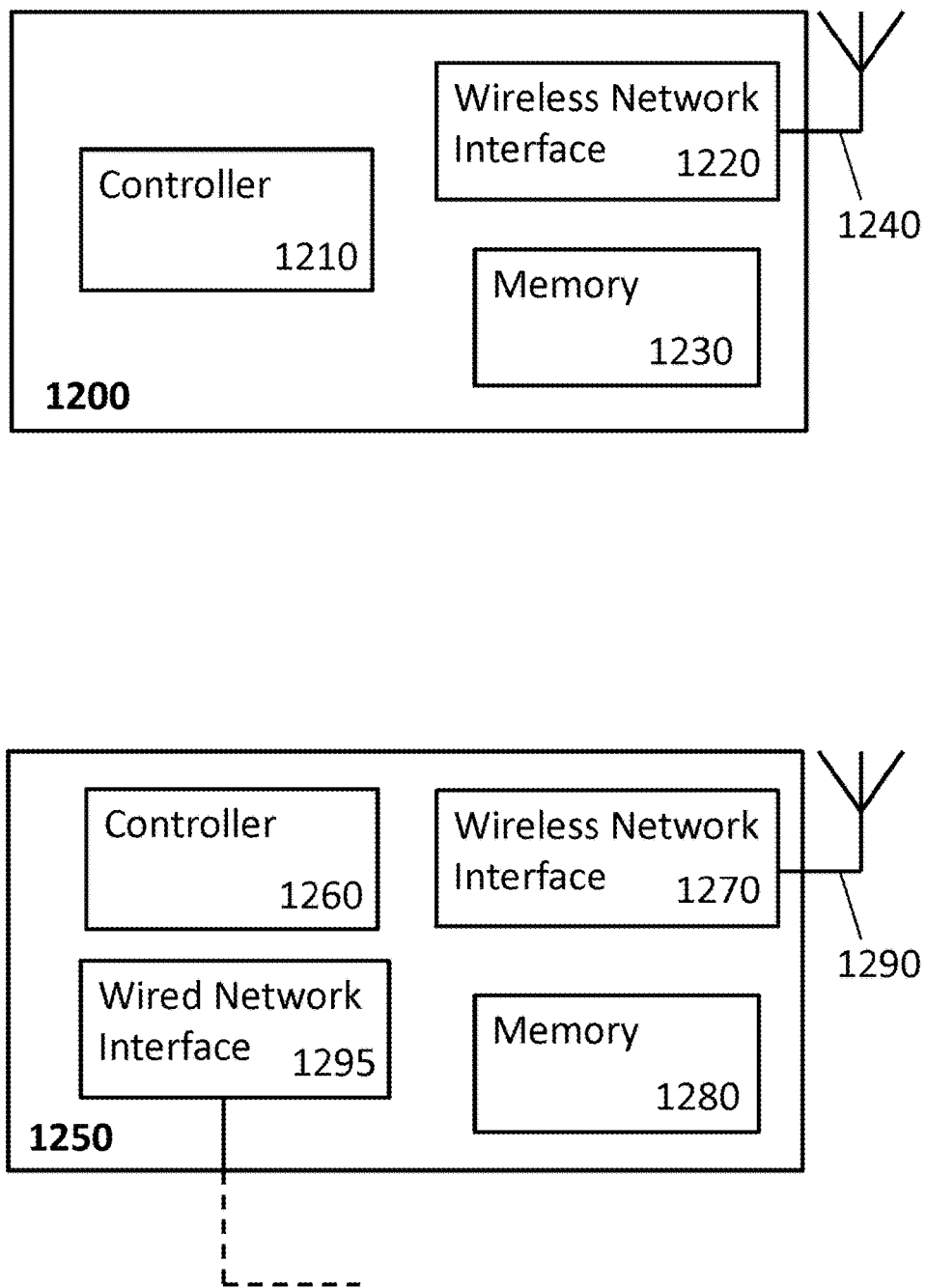
FIG. 12 shows a target device and anchor node.

FIG. 12 shows a target device 1200 and anchor node 1250. In the present arrangement, the target device 1200 is a wireless station, such as a smartphone, and comprises a controller 1210, a wireless network interface 1220 and a memory 1230.

The wireless network interface 1220 is coupled to an antenna 1240 for receiving wireless signals. The wireless network interface 1220 is operable to send and receive signals using the antenna 1240 on one or more of a plurality of radio frequency channels defined in a radiofrequency spectrum. The controller 1210 is configured to manage the wireless network interface 1220 to send and receive signals according to a communication protocol to, for example, stations or access points such as the anchor nodes 1250. The controller 1210 is in communicative connection with the memory 1230 which stores computer readable code for instructing the controller 1210 to perform the functions described herein.

In the present arrangement, the anchor node 1250 is a wireless access point. That is, the anchor node 1250 is configured to connect a wireless station, such as the target device 1200, to a wired network. The anchor node 1250 comprises a wireless network interface 1270, a memory 1280 and a controller 1260. The wireless network interface 1270 is coupled to an antenna 1290 for sending and receiving wireless signals. The anchor node 1250 is arranged much like the target device 1200, with the exception that the anchor node 1200 includes a wired network interface 1295 that is configured to connect to a wired network, for instance, via an Ethernet connection. The anchor node 1250 is configured to provide wireless stations, such as the target device 1200, with access to the wired network.

In a first arrangement, the target device 1200 is configured to receive signals from anchor nodes 1250. The controller 1210 is configured to receive the signals from the anchor nodes 1250 via the wireless network interface and determine the location of the target device 900 based on the received signals, a derived received signal quality indication and information contained in the signals, such as anchor node 1250 coordinates, as described above. Alternatively, the anchor node coordinates 1250 may be stored in the memory 1230 and retrieve upon identification of the relevant anchor nodes 1250 (e.g. via anchor node IDs contained within the signals).

In a further arrangement, the target device 1200 is configured to transmit one or more signals to the anchor nodes 1250. The anchor nodes 1250 form part of a system that is configured to determine the position of the target device 1200. The controller 1260 of each anchor node 1250 is configured to receive a signal from the target device 1200 via the wireless network interface 1270 and to determine the distance from the respective anchor node 1250 to the target device 1200. The controllers 1260 of the anchor nodes 1250 are also configured to calculate the respective received signal quality indicators for their received signal.

The system is configured determine the location of the target device 1200 based on the distances, the received signal quality indicators and the known locations of the anchor nodes 1250 (stored in memory). This may be calculated by one of the anchor nodes 1250 after the remaining anchor nodes 1250 have transferred their respective distances and received signal quality indications and locations (if not already stored in the memory of the one of the anchor nodes 1250). Alternatively, the system may comprise a central server comprising a controller that determines the position of the target device 900 after the anchor nodes 1250 have sent it their respective distances, received signal quality indications and locations (if not already stored in the memory of the server). The server may take on even more of the processing steps, for instance, the server may perform all of the processing steps should the anchor nodes 1250 transfer their received signal directly to the server.

In an alternative arrangement, the controller 1260 is configured to determine the angle of arrival of the received signals and the system is configured to determine the location of the target device 1200 based on the angles of arrival, the received signal quality indicators and the known locations of the anchor nodes 1250 (stored in memory).

The methods carried out by controllers 1210, 1260 of the target device 1200 (and, in some arrangements, the server) are described in more detail above. It will be appreciated that these methods are implemented by software or firmware code that may be stored in memories 1230 and 1280 of target device 1200 and anchor nodes 1200 respectively (and, in some arrangements, the server) and that, when executed by the respective controllers, puts the described methods into practice.

Any reference to controllers 1210 and 1260 is not intended to be limiting and is, instead, intended to be understood as a hardware component such as a processor that is capable of performing computational tasks.

While certain arrangements have been described, the arrangements have been presented by way of example only, and are not intended to limit the scope of the inventions. Indeed, the novel methods and devices described herein may be embodied in a variety of other forms; furthermore, various omissions, substitutions and changes in the form of the methods and systems described herein may be made.

The invention claimed is:

1. A target device configured to determine the location of the target device by use of a set of multiple anchor nodes having known locations, wherein the target device comprising:

an antenna configured to receive modulated radio frequency signals transmitted from the set of multiple anchor nodes, the radio frequency signals including information mapped to complex symbols;

a demodulator and equalizer configured to recover unequalized complex symbols and equalized complex symbols from the received radio frequency signals; and a controller configured to:

determine, for each anchor node, based on the received radio frequency signal, an estimate of the distance between the target device and the anchor node or an estimate of the angle of arrival of the radio frequency signal to the target device;

assign a weight for each anchor node based on a pre-equalization spectral flatness determined based on the unequalized complex symbols, or a received symbol distortion or a post-equalization spectral flatness determined based on the equalized complex symbols; and determine the position of the target device based on the estimates of the distances or the estimates of the angles of arrival for the multiple anchor nodes, the corresponding weights, and the locations of the multiple anchor nodes.

2. The target device of claim 1, wherein the received symbol distortion is based on the mean squared error of the equalized complex symbol relative to an expected symbol.

3. The target device of claim 1, wherein the weight for each anchor node is calculated as a function of one or more of: the received symbol distortion in a constellation diagram, the pre-equalization spectral flatness of the unequalized complex symbols, the post-equalization spectral flatness of the equalized complex symbols.

4. The target device of claim 1, wherein the position of the target device is determined based on the estimates of the distances between the target device and the respective anchor nodes, and wherein the weight $w_i$ for each anchor node is:

$$w_i = \frac{1}{d_i^2 FLpost_i^2}$$

wherein i indicates an ith anchor node in the set of multiple anchor nodes, $d_i$ is the estimate of the distance for the ith anchor node, and $FLpost_i$ is the post-equalization spectral flatness of the equalized complex symbols.

5. The target device of claim 1, wherein the controller is configured to determine the position of the target device based on the estimates of the distances between the target device and the respective anchor nodes via trilateration or weighted maximum likelihood multilateration using the weights assigned for the respective anchor nodes.

6. The target device of claim 1, wherein the the controller is configured to determine the estimate of the distance for each anchor node based on an indication of the strength of the received radio frequency signal which is determined based on the unequalized complex symbols, and/or based on the time of arrival of the radio frequency signal.

7. A method for a target device to determine the location of the target device by use of a set of anchor nodes having known locations, the method comprising:
receiving a modulated radio frequency signal transmitted from each anchor node, the radio frequency signals including information mapped to complex symbols;
recovering unequalized complex symbols and equalized complex symbols from the received radio frequency signal for each anchor node;
determining, for each anchor node, based on the received radio frequency signal, an estimate of the distance between the target device and the anchor node or an estimate of the angle of arrival of the radio frequency signal to the target device;
assigning a weight for each anchor node based on a pre-equalization spectral flatness determined based on the unequalized complex symbols, or a received symbol distortion or a post-equalization spectral flatness determined based on the equalized complex symbols; and
determining the position of the target device based on the estimates of the distances or the estimates of the angles of arrival for the multiple anchor nodes the corresponding weights, and the locations of the multiple anchor nodes.

8. The method of claim 7, wherein the received symbol distortion is based on the mean squared error of the equalized complex symbol relative to an expected symbol.

9. The method of claim 7, wherein the weight for each anchor node is calculated as a function of one or more of: the received symbol distortion in a constellation diagram, the pre-equalization spectral flatness of the unequalized complex symbols, the post-equalization spectral flatness of the equalized complex symbols.

10. The method of claim 7, wherein the position of the target device is determined based on the estimates of the distances between the target device and the respective anchor nodes, and wherein the weight $w_i$ for each anchor node is:

$$w_i = \frac{1}{d_i^2 FLpost_i^2}$$

wherein i indicates an ith anchor node in the set of multiple anchor nodes, $d_i$ is the estimate of the distance for the ith anchor node, and $FLpost_i$ is the post-equalization spectral flatness of the equalized complex symbols.

11. The method of claim 7, further comprising:
determining the position of the target device based on the estimates of the distances between the target device and the respective anchor nodes via trilateration or weighted maximum likelihood multilateration using the weights assigned for the respective anchor nodes.

12. The method of claim 7, further comprising:
determining the estimate of the distance for each anchor node based on an indication of the strength of the received radio frequency signal which is determined based on the unequalized complex symbols, and/or based on the time of arrival of the radio frequency signal.

* * * * *